United States Patent
Raney

(10) Patent No.: US 7,746,267 B2
(45) Date of Patent: Jun. 29, 2010

(54) SYNTHETIC APERTURE RADAR HYBRID-POLARITY METHOD AND ARCHITECTURE FOR OBTAINING THE STOKES PARAMETERS OF A BACKSCATTERED FIELD

(75) Inventor: Russell K. Raney, Annapolis, MD (US)

(73) Assignee: The Johns Hopkins University, Baltimore, MD (US)

( * ) Notice: Subject to any disclaimer, the term of this patent is extended or adjusted under 35 U.S.C. 154(b) by 182 days.

(21) Appl. No.: 12/116,357

(22) Filed: May 7, 2008

(65) Prior Publication Data

US 2009/0224964 A1    Sep. 10, 2009

Related U.S. Application Data

(60) Provisional application No. 60/916,673, filed on May 8, 2007.

(51) Int. Cl.
*G01S 13/90* (2006.01)
(52) U.S. Cl. ..................... 342/25 F; 342/188
(58) Field of Classification Search ........... 342/25 F
See application file for complete search history.

(56) References Cited

U.S. PATENT DOCUMENTS

| | | | | |
|---|---|---|---|---|
| 4,323,898 A | * | 4/1982 | Barnes et al. | 342/90 |
| 4,323,899 A | * | 4/1982 | Barnes et al. | 342/90 |
| 4,329,687 A | * | 5/1982 | Kloevekorn et al. | 342/136 |
| 4,928,131 A | * | 5/1990 | Onozawa | 342/188 |
| 7,495,764 B1 | * | 2/2009 | McMillan et al. | 356/364 |

OTHER PUBLICATIONS

Pascale Dubois-Fernandez et al., The Specificity of P Band Polinsar Data Over Vegetation; Polinsar, Frascati, Italy 2007.
Karl Tragl; Polarimetric Radar Backscattering from Reciprocal Random Targets; IEEE Transactions on Geoscience and Remote Sensing, vol. 28 No. 5, Sep. 1990; pp. 856-864.
V. Chandrasek et al., Analysis and Interpretation of Dual-Polarized Radar Measurements . . . ; 1994 American Meteorological Society; pp. 323-336.
Enrico Torlaschi et al., A Comparison of different Polarization Schemes . . . ; Radio Science, Viol. 33, No. 5, p. 1335-1352, Sep.-Oct. 1998.
Howard A. Zebker et al., Decorrelation in Interferometric Radar Echoes; IEEE Transactions on Geoscience and Remote Sensing, vol. 30 No. 5, Sep. 1992.
Shane Robert Clloude et al., An Entropy Based Classification Scheme . . . ; IEEE Transactions on Geoscience and Remote Sensing; vol. 25 No. 1, Jan. 1997.

(Continued)

*Primary Examiner*—Thomas H Tarcza
*Assistant Examiner*—Matthew M Barker
(74) *Attorney, Agent, or Firm*—Francis A. Cooch

(57) ABSTRACT

A synthetic aperture radar hybrid-polarity method and architecture comprising transmitting circular polarization (by driving the orthogonal linear feeds simultaneously by two identical waveforms, 90° out of phase), and receiving horizontal (H) and vertical (V) linear polarizations, coherently. Once calibrated, the H and V single-look complex amplitude data are sufficient to form all four Stokes parameters, which fully characterize the observed backscattered field.

12 Claims, 2 Drawing Sheets

OTHER PUBLICATIONS

Roger F. Reinking et al., Evaluation of a 45 degree Slant Quasi-Linear . . . , Journal of Atmospheric and Oceanic Technology, vol. 19, pp. 296-321.

Yoshio Yamaguchi et al., Four-Component Scattering Model for Polarimetric SAR . . . ; IEEE Transactions on Geoscience and Remote Sensing, vol. 43, No. 8, Aug. 2005.

Jakob J. van Zuyl et al., Imaging Radar Polarizaiton Signatures: Theory and Observation; Radio Science, vol. 22, No. 4, pp. 529-543, Jul.-Aug. 1987.

Martin A. Slade, et al.; Mercury Radar Imaging: Evidence for Polar Ice; Source: Science, New Series, vol. 258, No. 5082 (Oct. 23, 1992), pp. 635-640.

Albert Guissard, Mueller and Kennaugh Matrices in Radar Polarimetry, IEEE Transactions on Geoscience and Remote Sensing, vol. 32, No. 3, May 1994.

Sergey Y. Matrosov, On the Use of Radar Depolarizaiton Ratios for Estimating . . . ; 2001 American Meteorgological Society, vol. 40, pp. 479-490.

Ridha Touzi et al., On the Useof Permanent Symmetric Scatterers for Ship Characterization; IEEE Transactions on Geoscience and Remote Sensing, vol. 42, No. 10, Oct. 2004.

Jong-Sen Lee et al., Unsupervised Terrain Classification Preserving Polarimetric . . . ; IEEE Transactions on Geoscience and Remote Sensing, vol. 42, No. 4, Apr. 2004.

Carlos Lopez-Martinez et al., Statistical Assessment of Eigenvector-Based . . . ; IEEE Transactions on Geoscience and Remote Sensing, vol. 43, No. 9, Sep. 2005.

Jong-Sen Lee et al., Polarimetric SAR Data Compensation for Terrain . . . ; IEEE Transactions of Geoscience and Remote Sensing, vol. 38, No. 5, Sep. 2000.

Shane Robert Cloude et al., A Review of Target Decomposition Theorems . . . ; IEEE Transactions on Geoscience and Remot Sensing, vol. 34, No. 2, Mar. 1996.

Lynn M. Carter et al., Impact Crater Related Surficial Deposits on Venus: . . . ; Journal of Geophysical Research, vol. 109, E060009, doi: 10.1029/2003JE002227, 2004.

Enrico Torlaschi et al., Alternate Transmission of +45 degree and -45 degree . . . ; Journal of Atmospheric and Oceanic Technology, vol. 17, pp. 1066-1076.

N.J.S. Stacy et al., Stokes Vector Analysis of Lunar Radar Backscatter; pp. 30-32.

Jean-Claude Souyris et al., Compact Polarimetry Based on Symmetry Properties . . . ; IEEE Transactions on Geoscience and Remote Sensing, vol. 43, No. 3 Mar. 2005, pp. 634-646.

Rafael Zandona Schneider et al., Polarimetric and Interferometric Characterization . . . ; IEEE Transactions on Geoscience and Remote Sensing, vol. 44, No. 4, Apr. 2006.

R. Touzi et al., A rview of polarimetry in the context of synthetic aperture radar: concepts and . . . ; Can. J. Remote Sensing, vol. 30, No. 3, pp. 380-407, 2004.

* cited by examiner

SYNTHETIC APERTURE RADAR HYBRID-POLARITY METHOD AND ARCHITECTURE FOR OBTAINING THE STOKES PARAMETERS OF A BACKSCATTERED FIELD

CROSS-REFERENCE TO RELATED APPLICATIONS

This application claims the benefit of prior filed, co-pending U.S. provisional application No. 60/916,673, filed on May 8, 2007, which is incorporated herein by reference in its entirety.

STATEMENT OF GOVERNMENTAL INTEREST

This invention was made with Government support under Department of the Navy contract N00024-03-D-6606. The Government has certain rights in the invention.

BACKGROUND OF THE INVENTION

1. Field of the Invention

The present invention relates generally to synthetic aperture radar (SAR) and, more particularly, to a method and architecture to maximize the measurement potential of a SAR using a partial polarimetric scheme by obtaining the four Stokes parameters of a backscattered field.

2. Description of the Related Art

In many applications using space-based synthetic aperture radar (SAR), the prime objective is to maximize the measurement potential thereof in response to backscatter from a random field whose elements have unknown orientation relative to the polarity of the radar's illumination. Measurement potential is maximized, if and only if, the data products are the four Stokes parameters of the backscattered field (or their logical equivalent) (see R. K. Raney, "Dual-Polarized SAR and Stokes Parameters," *IEEE Geoscience and Remote Sensing Letters*, vol. 3, pp. 317-319, 2006, which is incorporated by reference herein in its entirety). Rotational invariance implies that the transmitted polarization must be circular. The choice of polarization basis for the receiver is open to optimization of the radar's design within reliability, mass, and power constraints.

The high-level objective of "partial polarimetry" or "compact polarimetry" (these terms are used interchangeably herein) is to exploit coherent dual-polarized radar data to realize many of the benefits of a quadrature-polarized system without the attendant costs, such as halved swath coverage and doubled average transmitter power. It should be stressed that any partial-polarimetry scheme is not an equivalent substitute for quadrature polarization. Partial polarimetry simply is a major and efficient step up from a single channel system towards full polarimetric measurement capabilities. Partial polarimetry is a reasonable strategy when system resources (power, mass, data volume, or cost) preclude full polarimetry. Partial polarimetry is also compatible as an optional mode for any radar that implements full polarimetry.

One of the first partial polarimetric concepts was the π/4 mode, which posits radiating a linearly-polarized field at 45° (with respect to either horizontal (H) or vertical (V) orientations), then receiving coherently the resulting H and V backscatter components. The concept subsequently was extended to include circularly polarized transmission, with the suggestion that the two types of transmitted polarization should lead to equivalent results. It is now generally accepted that these two transmit polarizations lead to different results (see R. K. Raney, "Decomposition of hybrid-polarity SAR data," presesnted at POLinSAR, Frascati, Italy, 2007, which is incorporated herein by reference in its entirety). For clarity, as used herein "hybrid-polarity" refers to the "circular transmit, H&V linear receive" case, in contrast to the "π/4 mode", which refers to the "slant-linear transmit, H&V linear receive" case. Both of these mixed-polarity modes have been used extensively in meteorological radar.

In the π/4 mode, decomposition analyses are most successful for scatterers within the scene whose orientation distributions are predominantly horizontal or vertical. In contrast, however, the objective of many applications is to ascertain the prevailing orientation of backscattering constituents, rather than to presume them at the outset. For such applications, an a priori assumption on backscatterer orientation is not appropriate. Further, there are important applications, such as planetary geology, in which decomposition should be able to classify dihedral-like backscattering features regardless of their orientation. Such applications are best served by rotational invariance, which requires that the illumination be circularly polarized. In short, the preferred form of compact polarimetry depends on the intended application.

An alternative compact polarimetric approach is to receive coherent dual-circular polarizations in response to a circularly-polarized transmitted field. End-to-end circular polarization has an extensive heritage in radar astronomy, from which very good results have been obtained, including backscatter analyses based on Stokes parameters. A spacecraft SAR that is circularly-polarized on transmit and dual-circularly-polarized on receive would be a viable alternative to the hybrid-polarity architecture described herein, but only if the required hardware were more appealing and the resulting measurements were comparably robust. However, such an embodiment implies several disadvantages in hardware and performance that are avoided by the hybrid-polarity method of this invention.

Circular polarization is not entirely foreign to Earth-observing SARS. Noteworthy examples include analysis of quadrature-polarized data from sloping terrain, for which it has been shown that synthesis of circularly-polarized data leads to results that are superior to those from the more conventional linearly-polarized data construct. However, in all such cases, the starting point requires data generated by a quadrature-polarized system, thus invoking all of the attendant disadvantages of that mode.

Recent studies conducted in support of two radars being implemented for deployment at the Moon have looked carefully at alternative architectures, within the constraints of small lunar orbiters. The science requirements include measurement of the circular-polarization ratio, maximized potential to distinguish between backscatter types, and robustness to randomly-oriented dihedral backscatterer distributions. The implementation requirements include minimal mass and power.

Given a SAR constrained to transmit only one polarization, what is needed are a method and architecture that meet two aggressive measurement objectives: (i) full characterization and exploitation of the backscattered field, and (ii) invariance to geometrical orientations of features in the scene.

SUMMARY OF THE INVENTION

Therefore, the present invention has been made in view of the above problems and constraints, and it is an objective of the present invention to provide a method and architecture to achieve both of the above measurement objectives.

Full characterization of the backscattered field implies coherent dual-polarization to support the four Stokes parameters. These are rotationally invariant with respect to backscatterer orientation, if and only if, the transmission is circularly polarized as provided by the inventive method and architecture. Given that the data products are the Stokes parameters, the receivers can use any orthogonal polarization basis.

Accordingly, the present invention provides a method and architecture for a synthetic aperture radar (SAR) having a hybrid-polarity architecture (CL-pol) that transmits circular polarization and receives two orthogonal mutually-coherent linear polarizations, which is one manifestation of partial or compact polarimetry.

According to one aspect of the invention, a method is provided for obtaining the Stokes parameters representing a backscattered field from a partial polarimetric synthetic aperture radar (SAR) comprising the steps of:

transmitting a circularly polarized field by the SAR;

receiving a coherently dual linear polarized backscattered field; and using data embedded in the received backscattered field to obtain the Stokes parameters.

According to another aspect of the invention, a partial polarimetric synthetic aperture radar (SAR) is provided for obtaining the Stokes parameters representing a backscattered field comprising:

a dual linearly-polarized antenna comprising a horizontal (H) feed and a vertical (V) feed;

a transmitter operatively connected to the antenna;

a 90 degree hybrid operatively connected to the transmitter and the antenna for simultaneously driving the H and V feeds 90 degrees out of phase thereby causing the antenna to radiate a circularly polarized field;

a receiver operatively connected to the antenna for receiving a coherent H and V linearly polarized backscattered field; and a processor operatively connected to the receiver for obtaining the Stokes parameters from data embedded in the backscattered field.

According to another aspect of the invention, the transmitted field may be either right-circularly-polarized, or left-circularly-polarized.

According to another aspect of the invention, the received data are used to calculate a 2×2 coherency matrix of the backscattered field.

According to another aspect of the invention, the Stokes parameters, or equivalently the coherency matrix, can be analyzed by decomposition techniques, whose parameter space is defined by a degree of polarization (m) and a relative phase (delta), two parameters that are presented as an example, but are not meant to limit the scope of the invention.

Advantages of the resulting SAR method and architecture include minimizing sensitivity to relative errors and crosstalk, and optimizing several aspects of relative phase and amplitude calibration, which are required for quantitative measurements. Further advantages include a simpler system with less RF hardware, less mass and power requirements, and fewer losses, in comparison to alternative means of realizing a coherent dual-polarized SAR.

Another advantage of this invention is that the radar swath width can be increased (by ScanSAR techniques) with respect to the width of a conventional strip-mapping SAR mode while still being polarimetric, in contrast to quadrature-polarimetric mode in which the swath width is only one-half that of a conventional strip-map SAR.

BRIEF DESCRIPTION OF THE DRAWINGS

These and other objects, features and advantages of the invention will be apparent from a consideration of the following Detailed Description considered in conjunction with the drawing Figures, in which.

DETAILED DESCRIPTION

Figure 1:
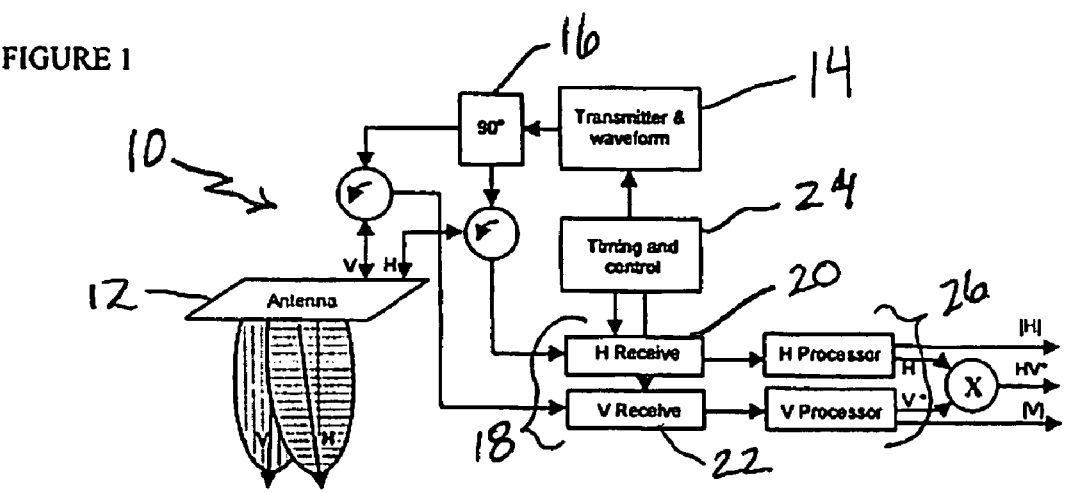
FIG. 1 is a schematic of the hybrid polarity architecture of the invention for a synthetic aperture radar (SAR).

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail.

The underlying theory with regard to the Stokes parameters is well-known in the art. A monochromatic electromagnetic (EM) field is represented by the ellipse swept out by its electric potential vector $E=[E_x E_y]^T$. In general analytic form, the orthogonal components of $E$ are $$E_x = a_1 \exp j(\tau + \delta_1)$$

$$E_y = a_2 \exp j(\tau + \delta_2) \qquad (1)$$

where $\tau$ represents the EM oscillation, and $\delta_2 - \delta_1 = \delta$ represents the relative phase between the two components. Stokes proved that such a field could be represented by four real numbers, known as the Stokes parameters $(S_1, S_2, S_3, S_4)$. These often are represented as $S=[S_1\ S_2\ S_3\ S_4]^T$ which is a logical vector, where $^T$ denotes transpose. In this formalism, the Stokes parameters, expressed in the backscatter alignment (BSA) convention appropriate for a monostatic radar geometry are $$S_1 = <a_1^2> + <a_2^2> = J_{xx} + J_{yy}$$

$$S_2 = <a_1^2> - <a_2^2> = J_{xx} - J_{yy}$$

$$S_3 = 2<a_1 a_2 \cos \delta> = 2 Re\, J_{xy}$$

$$S_4 = -2<a_1 a_2 \sin \delta> = -2 Im\, J_{xy} \qquad (2)$$

where the < . . . > indicate temporal (or locally spatial) averages, and the several J terms indicate elements of the 2×2 coherency matrix $J=<E \cdot E^{*T}>$ which is Hermitian. The intensity of the field is the trace $TrJ = J_{xx} + J_{yy}$ (the first Stokes parameter), and the degree of polarization in terms of the coherency matrix elements is $$m = +(1-[4 det J/(TrJ)^2])^{1/2} = [|\mu_{xy}|^2 + (1-|\mu_{xy}|^2)(S_2/S_1)^2]^{1/2} \qquad (3)$$

$$\text{where } \mu_{xy} = J_{xy}/(J_{xx}^{1/2} J_{yy}^{1/2}) \qquad (4)$$

is the complex degree of coherence. These quantities (together with other key parameters such as the two eigenvalues)

are rotationally invariant, thus they are not dependent on the particular polarimetric basis in which their values are determined. This fundamental fact forms part of the foundation for the architecture of the invention described and claimed herein.

Given a coherent, dual-polarized synthetic aperture radar (SAR) where the SAR's transmitted field is right-circularly polarized (R), then starting from focused, single-look complex data, the four Stokes parameters, in linear and circular polarization bases at the receiver, are $$S_1 = <|E_{RH}|^2 + |E_{RV}|^2> < |E_{RL}|^2 + |E_{RR}|^2>$$

$$S_2 = <|E_{RH}|^2 - |E_{RV}|^2> 2Re<E_{RL}E_{RR}^*>$$

$$S_3 = 2Re<E_{RH}E_{RV}^*> 2Im<E_{RL}E_{RR}^*>$$

$$S_4 = -2Im<E_{RH}E_{RV}^*> - <|E_{RL}|^2 - |E_{RR}|^2> \qquad (5)$$

In these expressions, E is the (complex) voltage in the subscripted polarization, * denotes complex conjugate, < . . . > denotes averaging (multi-looking in the SAR context), and Re and Im select the real or the imaginary value (respectively) of the complex cross-product amplitude. The first subscript denotes the transmit polarization, and the second subscript indicates the receive polarization.

The customary model for dual-polarization is to assume that the received basis is the same as the transmitted basis. In this context that would be "circular in and circulars out", for which the largest example is the Arecibo radar telescope at the Arecibo Observatory, Puerto Rico. The right-side column (Eqn (5)) corresponds to this familiar case. The invention described and claimed herein, however, is aimed at the unconventional alternative: the "circular in and linears out" combination. The Stokes parameters in the left-side column (Eqn (5)) correspond to this hybrid-polarity (CL-pol) architecture.

Each of the Stokes parameters is an elementary combination of two numbers, drawn from the powers (real) in the two channels, and the cross-product of the (complex) amplitudes. The cross-product (or equivalently, the corresponding differential phase) consists of two real numbers, the signed amplitudes of its real and imaginary components. The resulting set of four real numbers, evaluated at each pixel location in the multi-look image domain, comprises the fundamental output data from a coherent dual-polarized SAR. Of course, there are alternative frames of reference for the data products, such as the elements of the 2×2 coherency or covariance matrices. In principle, what is described herein applies equally to all such formulations.

There are two essential points to the above: (1) relative phase is required in addition to the amplitudes of the dual-polarized images if the backscattered field is to be fully characterized, and (2) for any given field the resulting characterization is independent of the particular basis vectors in which the coherent dual-polarized measurements are made.

Three quantitative measures of direct relevance to what is described herein follow from the Stokes parameters measured in the backscattered field. The first of these is the degree of polarization $$m = (S_2^2 + S_3^2 + S_4^2)^{1/2} / S_1 \qquad (6)$$

This form follows from the fundamental expression derived from the coherency matrix. Degree of polarization is closely related to the coherency parameter $|\mu_{xy}|$ (Eqn 4) which when expressed in terms of the Stokes parameters is $$|\mu_{xy}| = (S_3^2 + S_4^2)^{1/2} / (S_1^2 - S_2^2)^{1/2} \qquad (7)$$

The second parameter of interest is the circular polarization ratio $$\mu_C = (S_1 - S_4)/(S_1 + S_4) \quad 0 \leq \mu_C \qquad (8)$$

which is the traditional indicator of frozen volatile deposits. The third parameter is the relative phase between the two linear E-vectors of the backscattered field $$\delta = \mathrm{atan}(S_4/S_3) \quad -180° < \delta \leq 180° \qquad (9)$$

where the − or + sign of the phase indicates the rotation direction of the elliptically polarized field (R and L respectively).

Transmission of any field that is dominated by a linearly-polarized component introduces a rotational selectivity onto the observation. This is true regardless of the linearity orientation, be it horizontal (H) or vertical (V) or somewhere in between. When illuminated by linearly-polarized radiation, the backscattered polarization from a dihedral, for example, will depend to first order on the relative alignment of the axis of the dihedral with respect to the incoming field.

One scheme that has been proposed to sidestep the problem of conventional horizontal (H) or vertical (V) transmit polarization is to choose a linear polarization at 45° with respect to horizontal. This scheme still retains unwanted sensitivity to the orientation of linear features in the scene. In general, transmission of any field that has a dominant linearly-polarized component will lead to ambiguities or omissions in double-bounce decomposition. This is the fundamental characteristic that separates the present invention from any radar that transmits only in a single linear polarization.

The only globally valid solution to the above is to transmit circular polarization. Only a circularly-polarized transmitted field leads to rotationally invariant backscatter, since there is no "favored" linear alignment between the illumination and the scene's geometrical structure.

The expected sense of received circular polarization is opposite to the transmitted sense, in terms of the jargon of radar astronomy. For example, transmitting right (R)-circularly polarized usually results in left (L)-polarized backscatter being stronger, so that R becomes the cross-polarized receive state. This is because odd-bounce reflection usually dominates, as from specular facets, Bragg scattering from random rough distributions, or trihedrals (3-sided corners, either natural or fabricated). (Single-bounce circular polarization reversal is put to good use, for example, to separate GPS sea surface specular reflections from the direct path transmissions.)

In contrast, double-bounce backscatter, such as from dihedral reflectors, imposes an even number of phase reversals in the linear EM component that is aligned with the dihedral's axis. This has the effect of two offsetting phase reversals, leading to stronger backscatter in the same-sense circular polarity. As a direct consequence, double-bounce reflections of circularly-polarized waves are indicated rather sensitively by their relative phase. In the case of a lossless dihedral, the phase would differ by 180 degrees relative to that from a single-bounce scattering surface or from alternative odd-bounce shapes.

Enhanced same-sense circularly-polarized returns also may arise for reasons other than double-bounce. An important measurement in radar astronomy is the circular-polarization ratio (Eqn 8). This usually is evaluated as an explicit ratio of the image power in the same-sense circular polarization divided by the image power in the opposite-sense circular polarization, under the condition that the transmitted polarization is circular. The circular polarization ratio $\mu_C$ is anomalously large in response to volume scattering from ice deposits as on Europa or in the polar craters of Mercury. Under favorable conditions, the observed $\mu_C$ can exceed unity from such natural features. Of course, from a perfectly conducting dihedral, $\mu_C$ could be very large indeed.

The fundamental point to be drawn from these and related considerations is that the radar must transmit circular polarization if the backscattered field is to be rotationally invariant with respect to the geometric characteristics of the scene, or if circularly polarized signatures as well as linearly polarized signatures are to be observed.

Given that the transmitted polarization is circular, it would be natural to assume that the radar must be dual-circularly polarized on receive. However, such a conventional approach would fail to realize the advantages afforded by the inventive method and architecture described and claimed herein.

To date all conventional dual-polarized radars (and also all quadrature-polarized radars for that matter) are designed such that the receive polarization basis agrees with the transmitted basis. It follows that there always must be a "like-polarized" and a "cross-polarized" channel in the receiver, in which signal levels differ by up to 10 dB or more. Performance of a multi-polarization radar usually is limited by the weaker "cross-polarized" link, which is most impacted by additive noise, and by cross-talk and ambiguities from the stronger "like-polarized" signal.

Fundamental principles assure that the total power backscattered from a given scene element will be conserved when split into any pair of orthogonal polarizations. The obvious implication is that the energy will be divided evenly if and only if the receive polarizations have no "like-" or "cross-polarized" relationship to the transmitted polarization. Thus, if circular-polarization is transmitted, the receive polarization basis should be linear. While this combination is contrarian, it is objectively superior to all alternatives. This feature is a characteristic of the method and architecture of the present invention.

The Stokes parameters provide the foundation for this approach, since their evaluation does not depend on the measurement polarization basis. Consider an example. The circular polarization ratio expressed in terms of the Stokes parameters is $(S_1-S_4)/(S_1+S_4)$. Hence, $\mu_C$ may be calculated from either linearly-polarized or circularly-polarized received data, if the surface is illuminated by circularly polarized transmissions.

The underlying principle of the hybrid-polarity architecture is that linear polarization is a perfectly acceptable basis for a dual-polarized receiver observing backscatter from circularly-polarized transmissions.

A generic diagram of the hybrid-polarity (CL-pol) architecture 10 that results from the above discussion is shown in FIG. 1. A dual-linearly-polarized antenna 12 radiates circular polarization if the H and V feeds are driven simultaneously by equal average power, 90° out of phase. As in the passive-antenna embodiment illustrated in FIG. 1, this requires passing the transmitter 14 output through a 90° hybrid 16, whose outputs feed the H-elements and the V-elements, respectively. Also shown are receiver 18 comprising channels 20, 22 for receiving a coherent H and V linearly polarized backscattered field. Timing and control means 24 and a processor 26 to process the data from the receiver channels are also shown. The antennas for several contemporary Earth-observing SARs are active arrays, invariably comprised of H- or V-polarized elements, in which case each the same methodology applies. In such embodiments, each of the active elements would have to be activated and phased accordingly.

In the passive case, if there were a requirement to receive dual circular polarizations, then there would have to be an additional pair of ±90° hybrids in the receive paths, either directly after the antenna, or further along down each of the receive chains. However, 90° hybrids introduce additional mass and losses, as well as additional error sources in amplitude and phase. The hybrid-polarity method and architecture of the present invention avoids these extra burdens.

Target decomposition methodologies similar to those applied to fully-polarimetric data are applicable to data from a hybrid-polarity system. For example, double-bounce backscatter generates an unambiguous and distinct phase signature through a hybrid-polarity SAR. The double-bounce phase signature is independent of the relative orientation of reflecting dihedrals with respect to the linear basis vectors of the receive channels.

The precedent for quadrature-polarimetric radar target decomposition is extensive (see S. R. Cloude and E. Pottier, "A review of target decomposition theorems in radar polarimetry," *IEEE Trans. Geoscience and Remote Sensin*, vol. 34, pp. 498-518, 1996, which is incorporated by reference herein in its entirety) but the techniques are not necessarily appropriate for the simpler CL-pol architecture. The applicable 2×2 coherency matrix (Eqn 3) lends itself to a streamlined decomposition methodology.

At the outset, note that the two normalized eigenvalues depend upon only one parameter, the degree of polarization m (Eqns 3 and 6). The eigenvalues are $$\lambda_{1,2} = \tfrac{1}{2}(1 \pm m) \text{ where } \lambda_1 + \lambda_2 = 1, \text{ and } 0 \leq m \leq 1 \qquad (10)$$

The entropy of coherent dual-polarized data is $$H = -\lambda_1 \ln \lambda_1 - \lambda_2 \ln \lambda_2 \qquad (11)$$

which is monotonic between the minimum value of zero (when $\lambda_1=1$), and the maximum value of unity (when $\lambda_1=\lambda_2=\tfrac{1}{2}$). Respectively, these extrema represent the fully polarized case (m=1) and the fully depolarized case (m=0). The degree of polarization has long been recognized as the single most important parameter characteristic of a partially-polarized EM field (see E. Wolf, "Coherence properties of partially polarized electromagnetic radiation," *Nuovo Cimento*, vol. 13, pp. 1165-1181, 1959, which is incorporated by reference herein in its entirety). The close relationship between entropy and degree of polarization has been verified experimentally (see A. Aiello and J. P. Woerdman, "Physical bounds to the entropy-depolarization relation in random light scattering," *Physical Review Letters*, vol. 94, pp. 1-4, 2005, which is incorporated by reference herein in its entirety). The CL-pol decomposition scheme described and claimed herein is based on degree of polarization m as its first discriminant.

The Stokes parameters offer several candidates for a second decomposition parameter. Of these, the relative phase $\delta$ (Eqn 9) has the advantages that it is the most sensitive to polarimetric variations in the backscattered field, and that it is independent of a gain imbalance between the H and V receive channels. Under the condition of circularly-polarized illumination, $\delta$ is the prime indicator of double-bounce backscatter, and is the dominant ingredient in Stokes-derived norms such as the circular-polarization ratio $\mu_C$ (Eqn 8).

There are alternatives to the above. For example, the coherent single-look complex (SLC) H&V data are sufficient to calculate the 2×2 coherency matrix. Principal component analysis would follow from the coherency matrix eigenvectors. Likewise, the coherency matrix could be expanded into the four Pauli spin matrices, whose weighting coefficients are the Stokes parameters (see U. Fano, "A Stokes-parameter technique for the treatment of polarization in quantum mechanics," *Physical Review*, vol. 93, pp. 121-123, 1954, which is incorporated by reference herein in its entirety).

The over-arching inventive concept is that all of the data embedded in a dual-polarized backscattered field set up by an CL-pol radar can be captured by the Stokes parameters. Once these data are in hand, then any appropriate analysis methodology may be applied.

Figure 2:
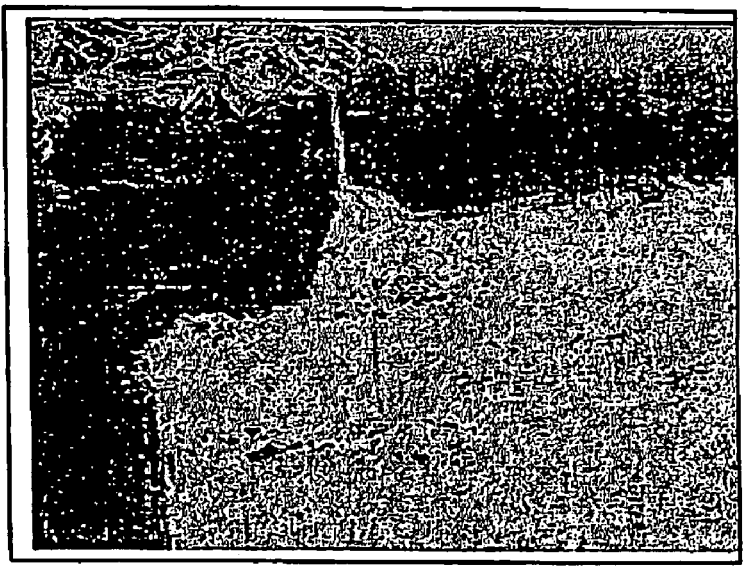
FIG. 2 is a SAR hybrid-polarity image of San Francisco (derived from quadrature-polarized data collected by the Jet Propulsion Laboratory).

The famous AIRSAR L-band data collected by the Jet Propulsion Laboratory (JPL) over the city of San Francisco (FIG. 2) provides a valuable test case to demonstrate the effectiveness of the CL-pol architecture in general, and m–δ decomposition in particular. In brief, the original quad-pol data were transformed to replicate circularly-polarized transmission and coherent H- and V-polarized reception. (The synthesis methodology for this transformation is outlined in the Appendix.) The degree of polarization m and the relative phase δ were found from the resulting Stokes parameters.

Figure 3:
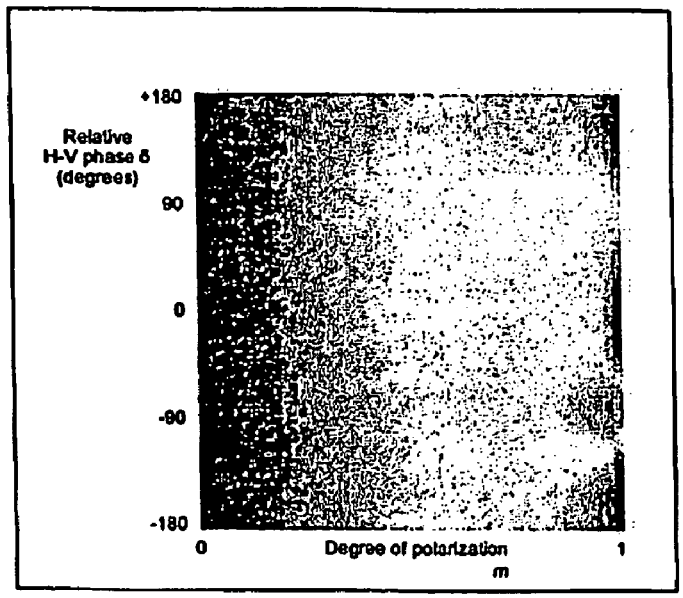
FIG. 3 is an m—delta decomposition of CL-pol version of the hybrid-polarity image data set from FIG. 2.
Figure 4:
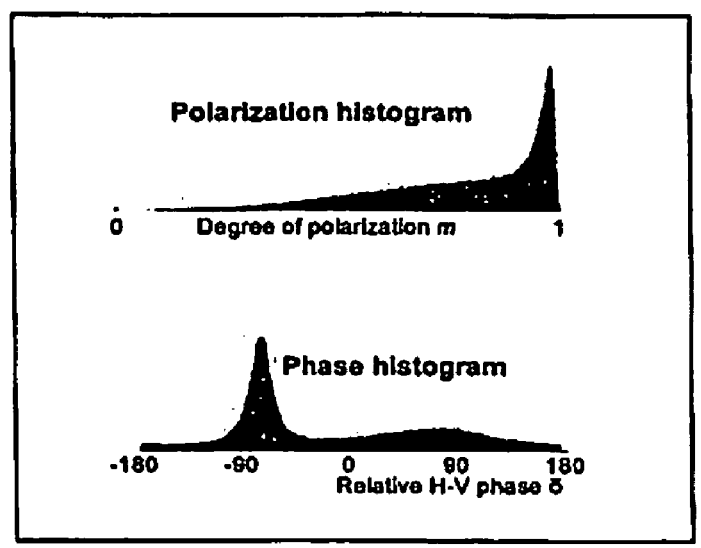
FIG. 4 illustrates the histograms of m and delta for the CL-pol version of the data from FIG. 2.

The results are shown in an m–δ feature space plot (FIG. 3) which is similar in principle to the entropy-alpha (H–α) decomposition, although there are significant differences. The histograms of m and δ are shown in FIG. 4. Note that "fully polarized" (~fully coherent) appears at m=1 in the m–δ decomposition, which is the obverse of "fully polarized" that corresponds to H=0 in the H-α method. One might argue that "fully polarized=>unity" is satisfying, since it is parallel to "full coherence =>unity". Note also that δ has a span of 360°.

The San Francisco CL-pol data demonstrate clear clustering tendencies in m–δ space, such as the neighborhoods of (0.85, +90°) and (0.95, –90°). These correspond to the expected opposite-circular polarization return from quasi-specular (odd-bounce) reflectors, and same-sense-circular polarization from dihedral reflectors, in response to right-circularly polarized transmission. This decomposition suggests that the dominant scattering mechanism within the San Francisco scene is double-bounce, most likely from the urban dihedral-dominated buildings, which agrees with the original quad-pol interpretation. (See the Appendix for a verification of this partition, and also for proof that the CL-pol architecture is not sensitive to the relative orientation of the dihedral axis with respect to horizontal.)

Note that the nominally "pure" circularly polarized dihedral distribution is centered at about –75°, rather than –90°. In effect this provides an indirect measure of the imperfect circularity of the transmitted field (synthesized from AirSAR's interleaved H and V transmissions). This demonstrates two interesting properties of the CL-pol architecture: (1) robustness in the face of imperfect transmitted circular polarity, and (2) a means of calibration that does not require controlled point targets (active or passive) in the scene. More on the calibration aspects of this architecture may be found in a POLinSAR paper incorporated by reference above.

The above discussion illustrates that data from CL-pol SAR architecture has a high potential for quantitative techniques. Analysis of such data by m–δ feature space or alternative methodologies is novel.

Hybrid-polarity SAR architecture leads to an efficient and flight-worthy instrument that supports a complete and objective dual-polarized measurement taxonomy. The architecture is characterized by several advantages:

Stokes parameter data products. Coherently dual-polarized received signals in the linear basis are sufficient to calculate the four Stokes parameters, which are rotationally invariant with respect to geometric trends in the scene since the transmit polarization is circular. Data products derived from the Stokes parameters do not depend on the polarization basis of the observation. All information in the backscattered field is retained.

Comparable signal levels. Neither receive channel is disadvantaged by being cross-polarized. Mean signal levels in the two channels of a CL-pol radar should always agree. For the same transmitted average power, the mean signal levels will be weaker by 3 dB than the signal level of the "like" or "expected" polarization in a conventional dual-polarized radar, hence 3 dB to 7 dB stronger than would be seen in the "cross" or "unexpected" polarized channel. There are two alternatives for circumventing the apparent 3-dB disadvantage: the first Stokes parameter preserves all backscattered power, and the single-look complex data could also be synthesized in the processor to provide explicit RCP and LCP images.

Cross-talk. Since the mean signal levels in the two receive channels have comparable levels, there is less risk of crosstalk or ambiguities from the stronger polarization corrupting the weaker polarization.

Calibration. When the radar is looking at nominally level but otherwise random terrain at nadir, the first- and second-order statistics of the signals in the two receive paths should be identical, regardless of the geometrical characteristics of the backscattering elements. If in practice they are not equal (such as gain or spectral offsets), then these discrepancies can be measured, and compensated. Likewise, the relative phase between the H and V components of the transmitted (circular) polarization, and the received polarizations (H and V) can be separately observed in real (random) backscatter, then compensated. These self-checking properties are unique to the hybrid-polarity architecture.

Error sensitivity. A sensitivity analysis shows that the circular-polarization ratio derived through a CL-pol SAR is less sensitive to channel imbalance by at least a factor of two than if explicitly calculated through the traditional "same sense over opposite sense" ratio. The hybrid-polarity error sensitivity advantage is more pronounced when the relative signal-to-noise ratios of the two polarization components are included in the analysis.

Favorable flight hardware. In many specific cases, less RF hardware is required in the CL-pol architecture than for an alternative design in which the radar is circularly-polarized on both transmit and receive. The simpler CL-pol architecture implies fewer losses, and fewer sources of potential channel-to-channel mismatch. For planetary or lunar missions, for which mass and power are severely limited, these hardware advantages coupled with the enhanced measurement capabilities of the present invention point to the CL-pol as the optimum architecture.

Aside on quadrature-polarization. These observations suggest, among other consequences, that an alternative way to configure a fully-polarimetric SAR is to use hybrid-polarity architecture; the transmitted polarizations would be R and L, interleaved, and the receive polarizations would be coherent H & V, following either transmission.

Aside on wide swath coverage. The hybrid-polarity architecture may be operated in a ScanSAR mode, in principle identical to ScanSAR swath-widening techniques in a single-polarity side-looking imaging radar. This is true, because only one transmitted polarization is required for the hybrid-polarity architecture, in distinct contrast to a quadrature-polarized SAR for which two orthogonal polarizations must be transmitted, interleaved, at an effective pulse-repetition frequency (PRF) that is twice that of the normal single-polarity mapping mode. Double PRF means that the swath width can be no more than half that of the single-polarity mapping mode. Thus, the hybrid-polarity method and architecture of the present invention enables polarimetric SAR operations over swaths that are four times or more the width that are the upper limit for an otherwise equivalent quadrature-polarimetric SAR.

The objective of the invention is full characterization and exploitation of the backscattered field with a monostatic radar that transmits in only one polarization, that is invariant to geometrical orientations in the scene, and that minimizes on-board resource requirements. Full characterization of the field requires measurement of the four Stokes parameters. Once these parameters are stipulated to be the radar's data products, then hybrid-polarity (CL-pol) architecture is the logical result. The arguments to this end progress through four ordered conclusions: (1) the receiver must be coherently dual-polarized; (2) the transmit polarization must be circular; (3) the receiver polarization basis does not have to be circular; and (4) the optimum receiver polarization basis is linear.

The pivotal objective reasons for these conclusions are: (1) the Stokes parameters require measuring the relative phase as well as the amplitudes of the received backscatter; (2) any non-circular illuminating polarization would impose preferential selectivity onto the backscattered polarizations in response to the relative alignment between the principal axis of the incoming elliptically polarized field and the angular orientation of scene constituents; (3) Stokes parameter values are independent of the observation polarization basis; and (4) signal levels in the two receivers are comparable, if and only, if the like- and cross-polarized constituents are evenly shared, because backscattered energy is conserved within any dual-polarized basis.

The CL-pol SAR architecture minimizes sensitivity to relative errors and cross-talk, and optimizes several aspects of relative phase and amplitude calibration, which are required for quantitative measurements. The CL-pol architecture can lead to a simpler system with less RF hardware, less mass and power requirements, and fewer losses, in comparison to alternative means of realizing a coherent dual-polarized SAR, all of which are required for a lunar, planetary, or earth-observing orbital radar.

Any extant radar that has simultaneous linearly-polarized dual-channel reception, and that transmits either H or V polarization, can be operated as a CL-pol system if the H and V transmissions are simultaneous, and 90-degrees out of phase. In contrast to an otherwise similar quadrature-polarized radar, a CL-pol system is not compromised by doubled average transmit power and halved swath width.

The Stokes parameters (or their equivalent derived from the radar processor's single-look complex data output products) support more and better quantitative measurements than would be available from a conventional dual-polarized radar including the circular-polarization ratio along with several other quantitative characterizations in the image domain. Data from a CL-pol SAR are fully characterized through a 2×2 matrix, which is well-suited to a streamlined decomposition strategy. The effectiveness of CL-pol decomposition is comparable to that of quad-pol target decomposition in several regards, as demonstrated by the m–δ method.

The CL-pol architecture (circular transmit polarization and coherent dual-linear polarization) is an alternative mode for Earth-observing imaging radars, and as the prime architecture for all lunar or planetary imaging radar missions.

While the invention has been described with reference to an example embodiment, it will be understood by those skilled in the art that a variety of modifications, additions and deletions are within the scope of the invention, as defined by the claims set forth below.

APPENDIX

The Stokes vector that corresponds to a CL-pol radar can be built from data available from a fully-polarimetric (quad-pol) data set. One way of doing so based on first principles entails five steps: (1) evaluate the electric vector $E_B$ of the backscattered field generated by right-circular illumination R impinging upon a scene described by the 2×2 Sinclair matrix $[\Sigma]$; (2) derive the corresponding $E_H$ and $E_V$ vectors of the single-look complex image observed through a linearly-dual-polarized (H and V) antenna, receiver, and processor sequence; (3) evaluate the four elements of the coherency matrix J (Eqn 2); (4) evaluate the Stokes vector S from the elements of J, and (5) evaluate the Stokes parameters by substituting corresponding data array elements from the C3 covariance matrix of the original quad-pol data.

Step 1. $E_B = [\Sigma]R$, where $S_{ij}$ are the elements of $[\Sigma]$, and $R = (1/\sqrt{2})[1 {-}j]^T = (1/\sqrt{2})[S_{xx} - jS_{xy}, S_{xy} - jS_{yy}]^T$ Step 2. $E_H = [1 0]E_B = (1/\sqrt{2})(S_{xx} - jS_{xy}), E_v = [0 1]E_B = (1/\sqrt{2})(S_{xy} - jS_{yy})$ Step 3. $2J_{xx} = <|S_{xx}|^2> + <|S_{xy}|^2> + j<S_{xx}S_{xy}{}^*> - j<S_{xy}S_{xx}{}^*>$ $2J_{xy} = <S_{xx}S_{xy}{}^*> - <S_{xy}S_{yy}{}^*> - j<S_{xy}|^2> - j<S_{xx}S_{yy}{}^*> J_{yx} = J_{xy}{}^*$ $2J_{yy} = <|S_{yy}|^2> + <|S_{xy}|^2> - j<S_{yy}S_{xy}{}^*> + j<S_{xy}S_{yy}{}^*>$ Step 4. $S_1 = J_{xx} + J_{yy}, S_2 = J_{xx} - J_{yy}$ $S_3 = Re\{<S_{xx}S_{xy}{}^*> + <S_{xy}S_{yy}{}^*>\} - Im<S_{xx}S_{yy}{}^*>$ $S_4 = -Im\{<S_{xx}S_{xy}{}^*> - <S_{xy}S_{yy}{}^*>\} - Re<S_{xx}S_{yy}{}> + <|S_{xy}|^2>$ Step 5. $S_1 = \tfrac{1}{2}C_{11} + \tfrac{1}{2}C_{22} + \tfrac{1}{2}C_{33} + (1/\sqrt{2})Im\ C_{12} + (1/\sqrt{2})Im\ C_{23}$ $S_2 = \tfrac{1}{2}C_{11} - \tfrac{1}{2}C_{33} + (1/\sqrt{2})Im\ C_{12} - (1/\sqrt{2})Im\ C_{23}$ $S_3 = (1/\sqrt{2})Re\ C^{12} + (1/\sqrt{2})Re\ C_{23} + Im\ C_{13}$ $S_4 = -(1/\sqrt{2})Im\ C_{12} - (1/\sqrt{2})Im\ C_{23} + Re\ C_{13} - \tfrac{1}{2}C_{22}$ It is instructive to evaluate the reflection from a trihedral and from a dihedral, seen by a CL-pol radar that transmits right-circular polarization. The trihedral's Sinclair matrix is $$[\Sigma_{Tri}] = \begin{matrix} 1 & 0 \\ 0 & -1 \end{matrix} \Rightarrow S_{Tri} = [1\ 0\ 0\ 1]^T, \delta = 90°$$

which are characteristic of left-circular polarization. This verifies that triple-bounce backscatter leads to "opposite-sense" received circular polarization. One might also calculate this result directly by the product of the trihedral Sinclair matrix with the RCP vector to get the LCP vector $L = (1/\sqrt{2})[1+j]^T$.

For a dihedral whose fold axis is at an angle θ with respect to horizontal, the Sinclair matrix is $$[\Sigma_{Dih}] = \begin{matrix} \cos 2\theta & \sin 2\theta \\ \sin 2\theta & \cos 2\theta \end{matrix} \Rightarrow S_{Dih} = [1\ 0\ 0\ -1]^T, \delta = -90°$$

which are characteristic of right-circular polarization. Note also that the response is independent of the orientation of the dihedral's axis, and 180° out of phase relative to the trihedral's phase.

What is claimed is:

1. A method for obtaining the Stokes parameters representing a backscattered field from a partial polarimetric synthetic aperture radar (SAR) comprising the steps of:
   transmitting a circularly polarized field by the SAR;
   receiving a coherently dual linear polarized backscattered field; and
   using data embedded in the received backscattered field to obtain the Stokes parameters.

2. The method as recited in claim 1, wherein the transmitting step comprises the step of driving two orthogonal linear feeds simultaneously by two identical waveforms, the waveforms being 90 degrees out of phase.

3. The method as recited in claim 1, further comprising the step of applying a decomposition methodology to analyze the data using the Stokes parameters.

4. The method as recited in claim 3, the applying a decomposition methodology step comprising the step of calculating a 2×2 coherency matrix.

5. The method as recited in claim 3, the calculating step further comprising calculating a degree of polarization and a relative phase.

6. A partial polarimetric synthetic aperture radar (SAR) for obtaining the Stokes parameters representing a backscattered field comprising:
   a dual linearly-polarized antenna comprising a horizontal (H) feed and a vertical (V) feed;
   a transmitter operatively connected to the antenna;
   a 90 degree hybrid operatively connected to the transmitter and the antenna for simultaneously driving the H and V feeds 90 degrees out of phase thereby causing the antenna to radiate a circularly polarized field;
   a receiver operatively connected to the antenna for receiving a coherent H and V linearly polarized backscattered field; and
   a processor operatively connected to the receiver for obtaining the Stokes parameters from data embedded in the backscattered field.

7. The SAR as recited in claim 6, wherein the SAR is operated in ScanSAR mode thereby achieving simultaneously wide swath coverage and polarimetric measurements.

8. The SAR as recited in claim 6, wherein the antenna comprises an active array of transmit/receive modules, each module comprising H and V feeds which on transmit are driven simultaneously 90 degrees out of phase by nominally identical signals.

9. The SAR as recited in claim 8, wherein the SAR is operated in ScanSAR mode thereby achieving simultaneously wide swath coverage and polarimetric measurements.

10. The SAR as recited in claim 6, further comprising a decomposition methodology for analyzing the data using the Stokes parameters.

11. The SAR as recited in claim 10, wherein the decomposition methodology comprises calculating a 2×2 coherency matrix.

12. The SAR as recited in claim 10, wherein the decomposition methodology comprises calculating one of a degree of polarization and a relative phase.

* * * * *